(12) United States Patent
Chang

(10) Patent No.: US 9,135,346 B2
(45) Date of Patent: Sep. 15, 2015

(54) INDEX DATA FOR NATIVE APPLICATIONS

(71) Applicant: Google Inc., Mountain View, CA (US)

(72) Inventor: Lawrence Chang, Foster City, CA (US)

(73) Assignee: Google Inc., Mounain View, CA (US)

( * ) Notice: Subject to any disclaimer, the term of this patent is extended or adjusted under 35 U.S.C. 154(b) by 273 days.

(21) Appl. No.: 13/912,921

(22) Filed: Jun. 7, 2013

(65) Prior Publication Data

US 2014/0365462 A1    Dec. 11, 2014

(51) Int. Cl.
*G06F 17/30* (2006.01)

(52) U.S. Cl.
CPC ............................... *G06F 17/30864* (2013.01)

(58) Field of Classification Search
CPC .................. G06F 17/30864; G06F 17/30867; G06F 17/3087; G06F 17/30067; G06F 17/30699
USPC ......................................................... 707/711
See application file for complete search history.

(56) References Cited

U.S. PATENT DOCUMENTS

| 7,617,225 | B2 | 11/2009 | Arrouye |
| 8,150,824 | B2 * | 4/2012 | Marmaros et al. ............ 707/706 |
| 8,326,826 | B1 | 12/2012 | Upstill et al. |
| 8,458,384 | B2 | 6/2013 | Johnson |
| 8,484,187 | B1 | 7/2013 | Hong et al. |
| 8,510,764 | B1 | 8/2013 | Deselaers |
| 8,515,979 | B2 | 8/2013 | Mehta |
| 8,554,345 | B2 | 10/2013 | Fernandez |
| 8,583,675 | B1 | 11/2013 | Haahr et al. |
| 8,595,450 | B2 | 11/2013 | Nguyen |
| 2004/0030882 | A1 | 2/2004 | Forman |
| 2005/0177562 | A1 | 8/2005 | Raciborski |
| 2007/0209080 | A1 | 9/2007 | Ture |

(Continued)

FOREIGN PATENT DOCUMENTS

| EP | 2474905 A2 | 7/2012 |
| EP | 2495670 A1 | 9/2012 |

OTHER PUBLICATIONS

"Deeplink.me Lets Mobile Users Navigate Through a "Web" of Apps," [online][Retrieved on Dec. 13, 2013]; Retrieved from the Internet URL: techcrunch.com/2013/05/22new-service-called-deeplink-me-will-let-mobile-users-navigate-through-a-web-of-apps/; 8 pages.

(Continued)

*Primary Examiner* — Cam-Y Truong
(74) *Attorney, Agent, or Firm* — Fish & Richardson P.C.

(57) ABSTRACT

Methods, systems, and apparatus for determining, for a native application that generates an application environment for display on a user device within the native application, the native application operating independent of a browser application that can operate on the user device, a set of environment instances of the native application, each environment instance of the native application being different from each other environment instance of the native application; for each environment instance: determining textual data describing features of the corresponding environment instance, the textual data being data that is not rendered to be visible when the native application renders the environment instance on a user device display, generating, from the textual data, native application environment instance data describing content of the environment instance, and indexing the native application environment instance data for the native application in an index that is searchable by a search engine.

14 Claims, 9 Drawing Sheets

(56) References Cited

U.S. PATENT DOCUMENTS

| | | | |
|---|---|---|---|
| 2009/0150363 | A1 | 6/2009 | Gross et al. |
| 2009/0241135 | A1 | 9/2009 | Wong et al. |
| 2010/0082661 | A1 | 4/2010 | Beaudreau |
| 2010/0257466 | A1 | 10/2010 | Wroblewski |
| 2010/0306191 | A1 | 12/2010 | LeBeau |
| 2011/0153712 | A1 | 6/2011 | Whetsel |
| 2011/0252038 | A1 | 10/2011 | Schmidt |
| 2011/0307463 | A1* | 12/2011 | Kasterstein et al. .......... 707/706 |
| 2011/0314004 | A1 | 12/2011 | Mehta |
| 2012/0110174 | A1 | 5/2012 | Wootton et al. |
| 2012/0124061 | A1 | 5/2012 | Macbeth |
| 2012/0158893 | A1 | 6/2012 | Boyns et al. |
| 2012/0159308 | A1* | 6/2012 | Tseng et al. .................. 715/234 |
| 2012/0179706 | A1 | 7/2012 | Hobbs |
| 2012/0179955 | A1 | 7/2012 | French |
| 2012/0254776 | A1 | 10/2012 | Corella et al. |
| 2012/0290584 | A1 | 11/2012 | De Bona et al. |
| 2012/0316955 | A1 | 12/2012 | Panguluri |
| 2012/0323898 | A1 | 12/2012 | Kumar |
| 2013/0006897 | A1 | 1/2013 | Jain |
| 2013/0007821 | A1 | 1/2013 | Berkowitz |
| 2013/0110815 | A1 | 5/2013 | Tankovich |
| 2013/0111328 | A1 | 5/2013 | Khanna |
| 2013/0122861 | A1 | 5/2013 | Kim |
| 2013/0124606 | A1 | 5/2013 | Carpenter |
| 2013/0191360 | A1 | 7/2013 | Burkard |
| 2013/0232256 | A1 | 9/2013 | Lee |
| 2013/0298007 | A1 | 11/2013 | Cullen |
| 2013/0325856 | A1 | 12/2013 | Soto |

OTHER PUBLICATIONS

"Google's Search Results Can Deep-Link to Your Android Apps," [online] [Retrieved on Dec. 13, 2013]; Retrieved from the Internet URL: techcrunch.com/2013/10/31/android-4-4-kitkat-app-indexing/; 6 pages.

"How to get a deep link of my application from the Windows Phone Marketplace using .NET code?," [online] [Retrieved on Dec. 13, 2013]; Retrieved from the Internet URL: stackoverflow.com/questions/13639564/how-to-get-a-deep-link-of-my-application-from-the-windows-phone-marketplace-usin; 2 pages.

"Indexing apps just like websites," [online] [Retrieved on Dec. 13, 2013]; Retrieved from the Internet URL: googlewebmastercentral.blogspot.com/2013/10/indexing-apps-just-like-websites.html; 4 pages.

"Instant Pages on Google Chrome," [online] [Retrieved on Dec. 16, 2013]; Retrieved from the Internet URL: chrome.blogspot.jp/2011/instant-pages-on-google-chrome.html; 3 pages.

"Mobile deep linking," [online] [Retrieved on Dec. 13, 2013]; Retrieved from the Internet URL: en.wikipedia.org/wiki/Mobile_deep_linking; 2 pages.

"Ready for a "Web" of Apps? Quixey Launches AppURL, A New Way to Enable Deep Linking Across Mobile Applications," [online] [Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages.

Google Play Store [online]. [retrieved on Mar. 11, 2013]. Retrieved from the Internet: <URL: https://play.google.com/store>, 3 pages.

Visability for Your Apps/Android Developers Developer.Andriod.com [online]. [retrieved on Mar. 11, 2013]. Retrieved from the Internet: <URL: http://developer.android.com/distribute/googleplay/about/visibility.html>, 6 pages.

Klais, "5 SEO Tips to Get Mobile Apps Ranked in SERPs," Search Engine Land [online], Dec. 19, 2011 [retrieved on Mar. 11, 2013]. Retrieved from the Internet: <URL: http://searchengineland.com/5-seo-tips-to-get-mobile-apps-ranked-in-serps-104595>, 6 pages.

International Search Report and Written Opinion in International Application No. PCT/US2014/011256, mailed Apr. 15, 2014, 12 pages.

"Adding deep linking to Google+ posts shared from your iOS app," [online][Retrieved on Jan. 7, 2014]; Retrieved from the Internet URL: https://developers.google.com/+/mobile/ios/share/deep-link; 3 pages.

"App Linking," [online][Retrieved on Jan. 7, 2014]; Retrieved from the Internet URL: https://developers.facebook.com/docs/android/link-to-your-native-app/; 14 pages.

"Class Gecko View Content," [online][Retrieved on Jan. 2, 2014]; Retrieved from the Internet URL: people.mozilla.org/~mfinkle/geckoview/docs/org/Mozilla/gecko/GeckoViewContent.html; 4 pages.

"Frequently Asked Questions—General Information," [online][Retrieved on Jan. 7, 2014]; Retrieved from the Internet URL: https://linksmanager.com/Frequently+Asked+Questions+-+General+Information; 8 pages.

"How to determine when an application is fully launched?" [online][Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.

"NSApplication Class Reference," [online][Retrieved on Jan. 2, 2014]; Retrieved from the Internet URL: https://developer.apple.com/library/mac/documentation/cocoa/reference/applicationkit/classes/NSApplication_Class/Reference/Reference.html; 66 pages.

"Seven Tips for Supercharging Your Links," [online][Retrieved on Jan. 7, 2014]; Retrieved from the Internet URL: goarticles.com/article/Seven-Tips-For-Supercharging-Your-Links/3056299/; 5 pages.

"Sharing to Google+ from your Android app," [online][Retrieved on Jan. 7, 2014]; Retrieved from the Internet URL: https://developers.google.com/+/mobile/android/share/#handling_incoming_deep_links; 2 pages.

International Search Report and Written Opinion in International Application No. PCT/US2014/021315, mailed Jun. 27, 2014, 11 pages.

Lin et al., "SPADE: Scalable App Digging with Binary Instrumentation and Automated Execution," Jan. 1, 2013, pp. 1-12, Technical Report MSR-TR-2013-126 Retrieved from the Internet: URL:http://research.microsoft.com/pubs/206889/main.pdf [retrieved on Oct. 17, 2014].

Amalfitano et al, "A GUI Crawling-Based Technique for Android Mobile Application Testing," Software Testing, Verification and Validation Workshops (ICSTW), 2011 IEEE Fourth International Conference on, IEEE, Mar. 21, 2011, pp. 252-261.

International Search Report and Written Opinion in International Application No. PCT/US2014/041218, mailed Oct. 29, 2014, 13 pages.

* cited by examiner

INDEX DATA FOR NATIVE APPLICATIONS

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc.

A variety of search engines are available for identifying particular resources accessible over the Internet. These search engines crawl and index the various web page resources. The search engine then uses the index to determine which resources are most responsive to a search query and provides search results that link to the resources in response to the query.

With the advent of tablet computers and smart phones, native applications that facilitate the performance of the same functions facilitated by the use of web page resources are now being provided in large numbers. So too are native applications that provide virtual experiences—such as rich, interactive, three-dimensional experiences; graphical based applications in which there is little textual data; and so on. Many of the native applications that provide virtual experiences do not include native application pages from which data that can be indexed can be extracted by a search engine. Instead, metadata from other sources external to the native application and regarding the native application are indexed and then accessed when processing search queries.

SUMMARY

This specification describes technologies relating indexing application pages of native applications.

In general, one innovative aspect of the subject matter described in this specification can be embodied in methods that include the actions of determining, for a native application that generates an application environment for display on a user device within the native application, the native application operating independent of a browser application that can operate on the user device, a set of environment instances of the native application, each environment instance of the native application being different from each other environment instance of the native application; for each environment instance: determining textual data describing features of the corresponding environment instance, the textual data being data that is not rendered to be visible when the native application renders the environment instance on a user device display, generating, from the textual data, native application environment instance data describing content of the environment instance, and indexing the native application environment instance data for the native application in an index that is searchable by a search engine. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The information stored in the application index of native application pages is taken from index data specified for the environment instance, and may thus provide a more comprehensive description of application content than is provided by metadata that is external to the native application and that describes the native application. This, in turn, may provide a search engine with the ability to determine relevance measures that are more accurate than relevance measures based on the metadata describing the native application. In particular, the application index of environment instances provides a search engine with the capability of surfacing search results for native applications that take into account the actual content of the environment instances of the native application. This is potentially more accurate than relying solely on metadata that is descriptive of a native application, such as a title and description of the native application.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system indexes environment instances of native applications. As used herein, a native application generates environment instances for display on a user device within an environment of the native application, and operates independent of a browser application on the user device. A native application is an application specifically designed to run on a particular user device operating system and machine firmware and not within a browser. Native applications thus differ from browser and browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific as are native applications.

An environment instance of a native application is an instance of particular user experience environment within a native application, and the environment instances are each characterized by unique set of user interface features distinguishable from each other in the native application. For example, environment instances can be particular modes in an application, such as options screens, or three-dimensional sequences, such as a "tour" of a three dimensional space or an action sequence, such as a downhill skiing event, and the like. In the case of the latter, the user experience may be time based and require multiple frames, such as a three-dimensional experience in a game during which a user attempts to complete a task.

To index data for a native application, the system determines a set of environment instances of the native application. For each of these environment instances, the system determines textual data describing features of the corresponding environment instance. The textual data is data that is not rendered to be visible when the native application renders the environment instance on a user device display. For example, the publisher of the native application can embed the textual data as invisible text into an environment, or alternatively can provide the textual data along with a uniform resource identifier that identifies (or otherwise facilitates instantiation of) the environment instance in the native application. The system then generates, from the textual data, native application environment instance data describing content of the environment instance and indexes the native application environment instance data for the native application in an index that is searchable by a search engine. The search engine, in turn, can access the indexed data to determine environment instances of native applications that may be responsive to queries.

Operation of the system that indexes application page data and the processing of search results for application pages is described in more detail below.

Figure 1A:
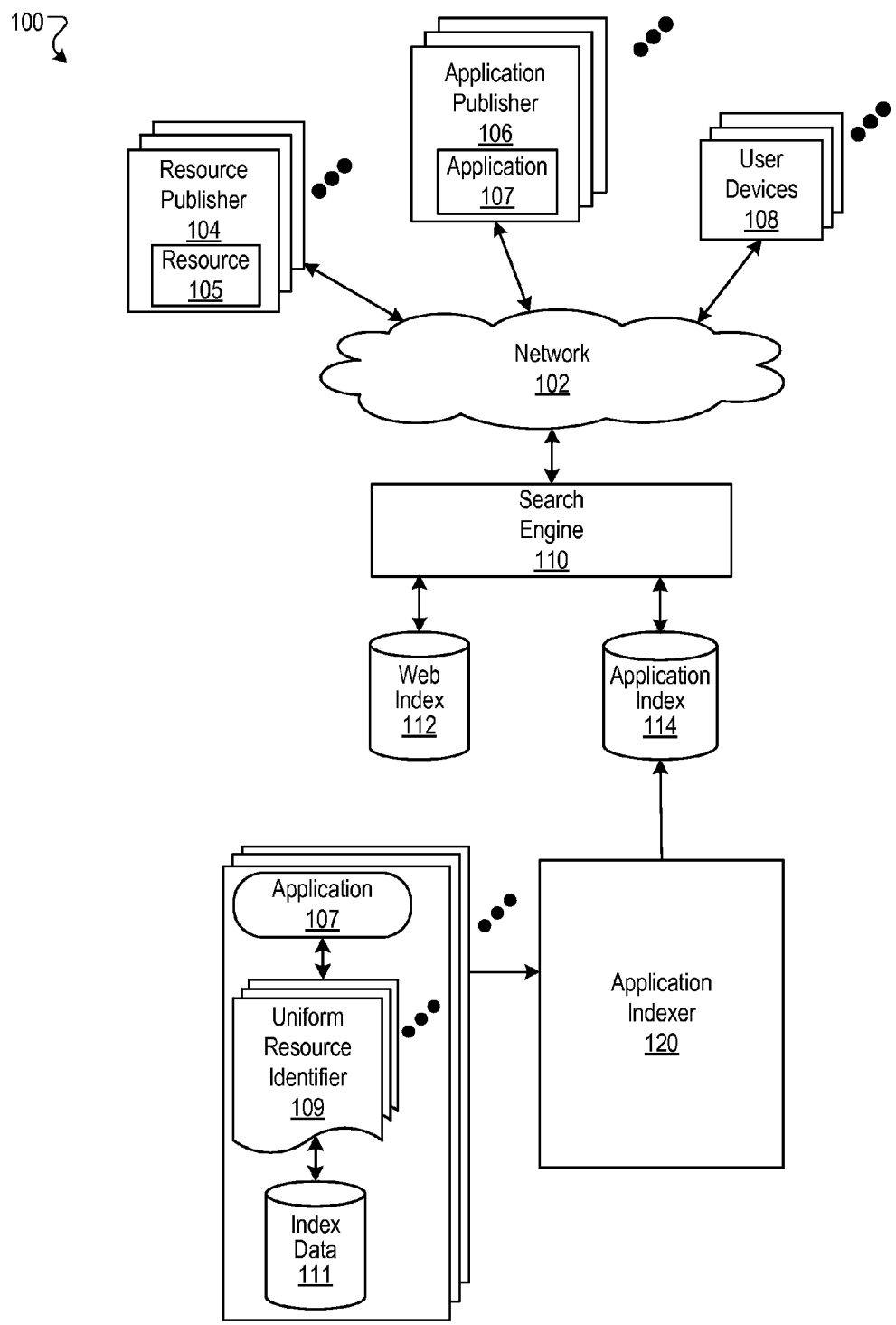
FIG. 1A is a block diagram of an example environment in which application environments for native applications are indexed and searched.

FIG. 1A is a block diagram of an example environment 100 in which application pages for native applications are indexed and searched. A computer network 102, such as the Internet, connects resource publisher web sites 104, application publishers 106, user devices 108 and a search engine 110.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts.

An application publisher website 106 may also include one or more web resources 105, and also provides native applications 107. As described above, a native application 107 is an application specifically designed to run on a particular user device operating system and machine firmware. As described above, a native application may have multiple environments, each specific to the particular native application. An environment instance differs from a rendered web resource in that the environment instance occurs within and is specific to the native application, while a web resource may be rendered in any browser for which the web page resource is compatible, and is independent of the operating system of the user device.

A user device 108 is an electronic device, and is capable of requesting and receiving web page resources 104 and native applications 107 over the network 102. Example user devices 108 include personal computers, mobile communication devices, and tablet computers.

To search web resources 105 and the native applications 107, the search engine 110 accesses a web index 112 and an application index 114. The web index 112 is an index of web resources 105 that has, for example, been built from crawling the publisher web sites 104. The application index 114 is an index of environment instances for native applications 107, and is constructed using an application indexer 120 that implements an indexing process that is described in more detail below. Although shown as separate indexes, the web index 112 and the application index 114 can be combined in a single index.

The user devices 108 submit search queries to the search engine 110. In response to each query, the search engine 110 accesses the web index 112 and the application index 114 to identify resources and applications, respectively, that are relevant to the query. The search engine 110 may, for example, identify the resources and applications in the form of web resource search results and native application search results, respectively. Once generated, the search results are provided to the user device 108 from which the query was received.

A web resource search result is data generated by the search engine 110 that identifies a web resource and provides information that satisfies a particular search query. A web resource search result for a resource can include a web page title, a snippet of text extracted from the resource, and a resource locator for the resource, e.g., the URL of a web page.

A native application search result specifies a native application and is generated in response to a search of the application index 114 of environment instances. A variety of functions can be invoked by the selection of an application search result. For example, selection of a native application search result may cause the native application to launch (if installed on the user device 108) and generate the environment instance of the native application referenced in the native application search result.

Figure 2A:
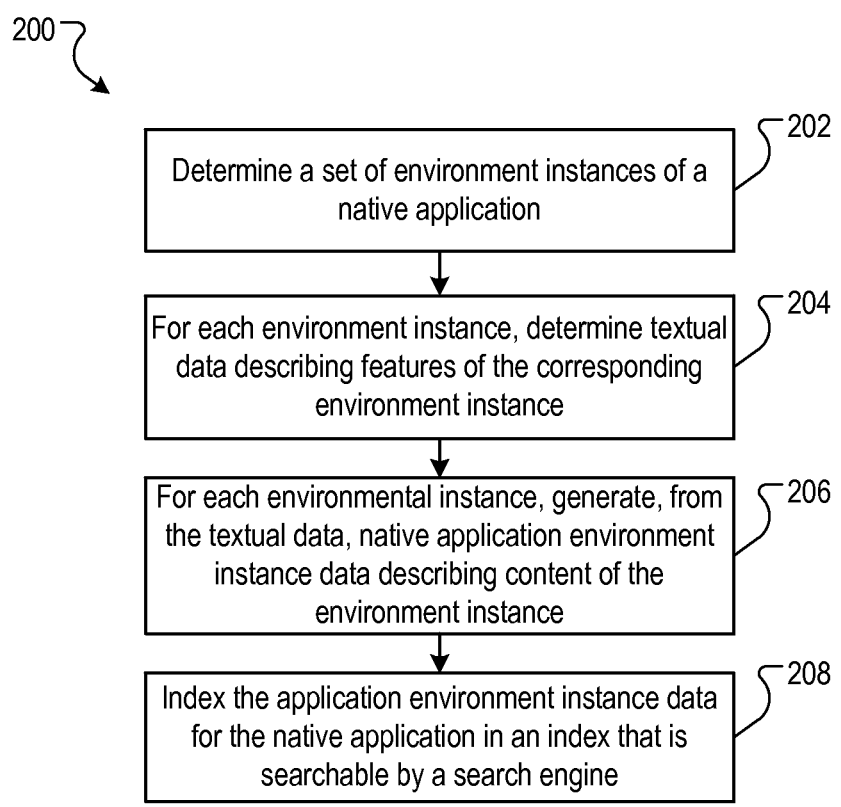
FIG. 2A is a flow diagram of an example process for indexing environment instances of native applications.

The collection of environment instance index data and indexing of the data for the application index 114 is described with reference to FIG. 2A, which illustrates a flow diagram of an example process 200 for indexing environment instances of native applications. The process 200 can be implemented in a data processing apparatus of one or more computers in data communication with each other.

The process 200 determines a set of environment instances of a native application (202). There are a variety of appropriate ways the process 200 can determine a set of environment instances. In some implementations, a publisher provides a set of uniform resource identifiers for the native application. Each uniform resource identifier in the set corresponds to an environment instance that the publisher desires to be indexed. In other implementations, the process can utilize a virtual machine to explore the native application. The latter implementation is described in more detail with reference to FIGS. 1B and 2B below.

For each environment instance, the process 200 determines textual data describing features of the corresponding environment instance (204). The textual data are data that are not rendered to be visible when the native application renders the environment instance on a user device display. The textual data, in some implementations, is provided by the publisher of the native application. In some implementations, textual data for each environment instance is keyed to the uniform resource identifier that corresponds to the environment instance. For example, for a native application that simulates a driving experience for various automobiles, the publisher of the native application may provide uniform resource identifiers that correspond to three-dimensional representations of the automobiles simulated in the application, and a "behind the wheel" view that is the beginning of a simulated driving experience. For each of these environment instances, the textual data describes features of the environment instance corresponding to the uniform resource identifier. The textual data may, in some implementations, be embedded in the native application and overlaid on the rendered environment instance as invisible text, or may be provided with the uniform resource identifiers, or be both embedded and provided with the uniform resource identifiers.

In some implementations in which the environment instance has multiple states, textual data can be included with each change in state. A "state" in an environment instance a time during which the environment instance is characterized by a unique interaction model that state. For example, in a car racing game, a "racing" environment instance might be the cockpit view from behind the wheel. The first state may be, for example, a pole position view during which objectives are displayed and during which time the cars are not racing and controls for acceleration, braking and steering are not responsive. A second state may be a racing state during which controls for acceleration, braking and steering are responsive. Finally, a third state may be a pit stop state during which car status is displayed to the user, and controls again are not responsive. For each of these states corresponding textual data describing features of the racing environment instance for each state may be provided when the native application transitions to the subject state.

In some implementations, additional data can also be used, such as textual data that is rendered in an environmental instance. For example a financial services native application may have menu options and descriptions of the menu options that are rendered in an environment instance, and this visible textual data can also be used to describe features of the corresponding environment instance. Other types of data that appropriately describes the environmental instance can also be used.

For each environment instance, the process 200 generates, from the textual data, native application environment instance data describing content of the environment instance (206). In implementations in which the textual data for each environment instance is keyed to the uniform resource identifier that corresponds to the environment instance, and provided with the uniform resource identifiers.

The process 200 indexes the application environment instance data for the native application in an index that is searchable by a search engine (208). The data are indexed such that the search engine 110 may evaluate the relevance of environment instances to search queries.

Figure 1B:
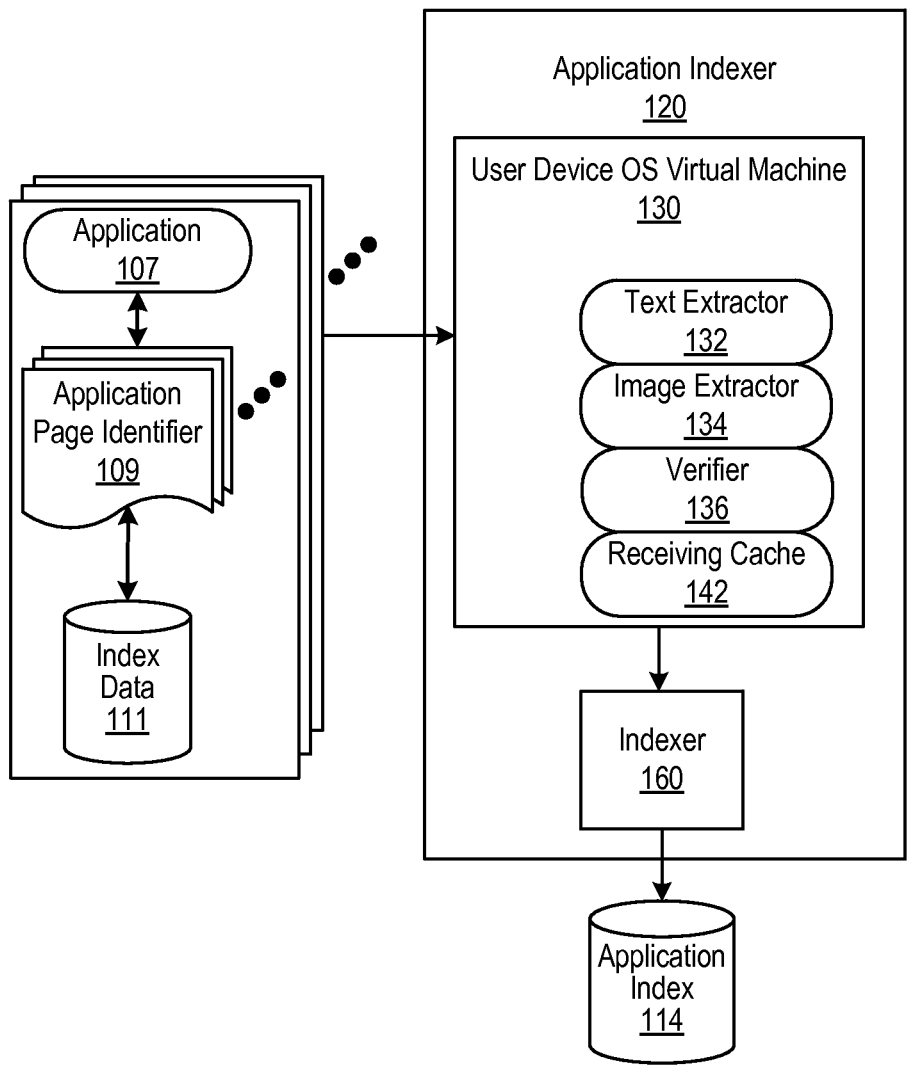
FIG. 1B is a block diagram of an example implementation of a native application indexer.
Figure 2B:
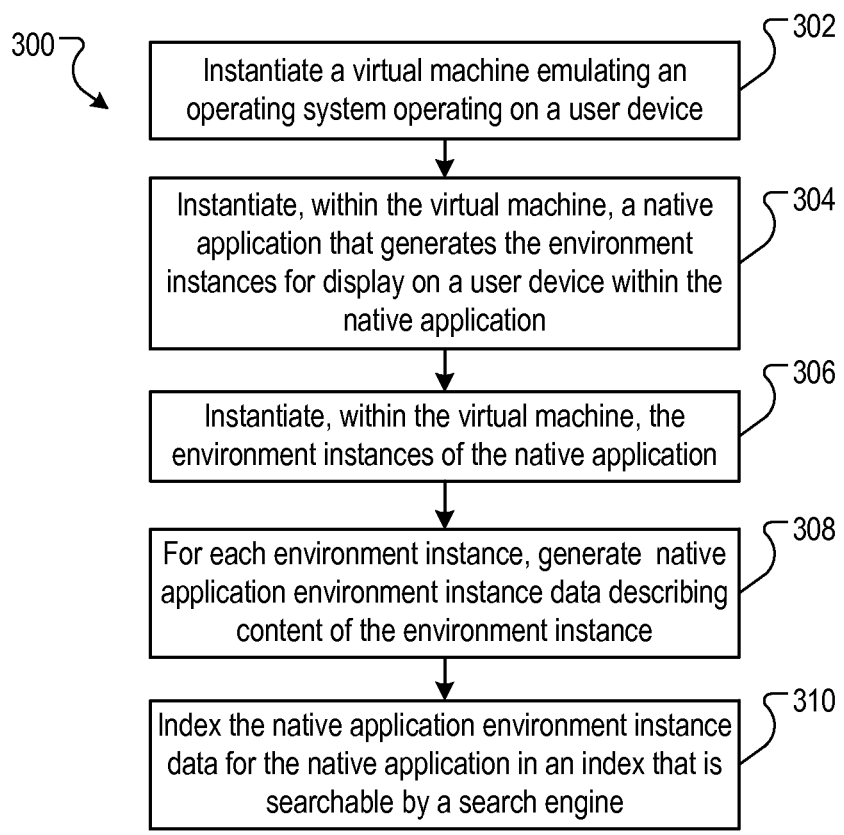
FIG. 2B is a flow diagram of an example process for indexing environment instances of native applications using a virtual machine.

FIG. 1B is a block diagram of an example implementation of a native application indexer 120. The operation of the example implementation is described with reference to FIG. 2B, which is a flow diagram of an example process 300 for indexing environment instances of native applications using a virtual machine. The process 300 can be implemented in a data processing apparatus of one or more computers in data communication with each other. Other implementations may also be used.

The process 300 instantiates a virtual machine 130 emulating an operating system for a user device (302). The virtual machine 130 may, in some implementations, be a modified version of the operating system and includes extractors that extract data from application pages as described in more detail below.

The process 300 instantiates, within the virtual machine 130, a native application 107 that generates environment instances for display on a user device within the native application 107. For example, the virtual machine 130 may, for each application in a set of native applications 107 to be processed, launch an instance of the native application 107.

The process 300 instantiates, within the virtual machine, the environment instances of the native application (306). In some implementations, the virtual machine 130 instantiates the environment instances by an automated process that explores various menus and selection options available in each environment instance, and each subsequent environment instance. Such an automated process can be accomplished by sequentially selecting menu options and links according to a deterministic routine that results in the selection of each environment instance provided by the native application 107.

Alternatively, the virtual machine 130 can access the environment instances that are specified by a publisher of the native application. For example, as described above, the application publisher may provide a list of uniform resource identifiers 109 that the publisher desires to be crawled and indexed in the application index 114, and only those environment instances referenced by the URIs for the particular native application 107 are accessed and indexed.

For each environment instance, the process 300 generates native application environment instance data describing content of the environment instance (208). The native application environment instance data may be generated from the index data 111, which is the textual data describing the content of the native application environment instance data and that is not visibly rendered in the environment instance.

Figure 6:
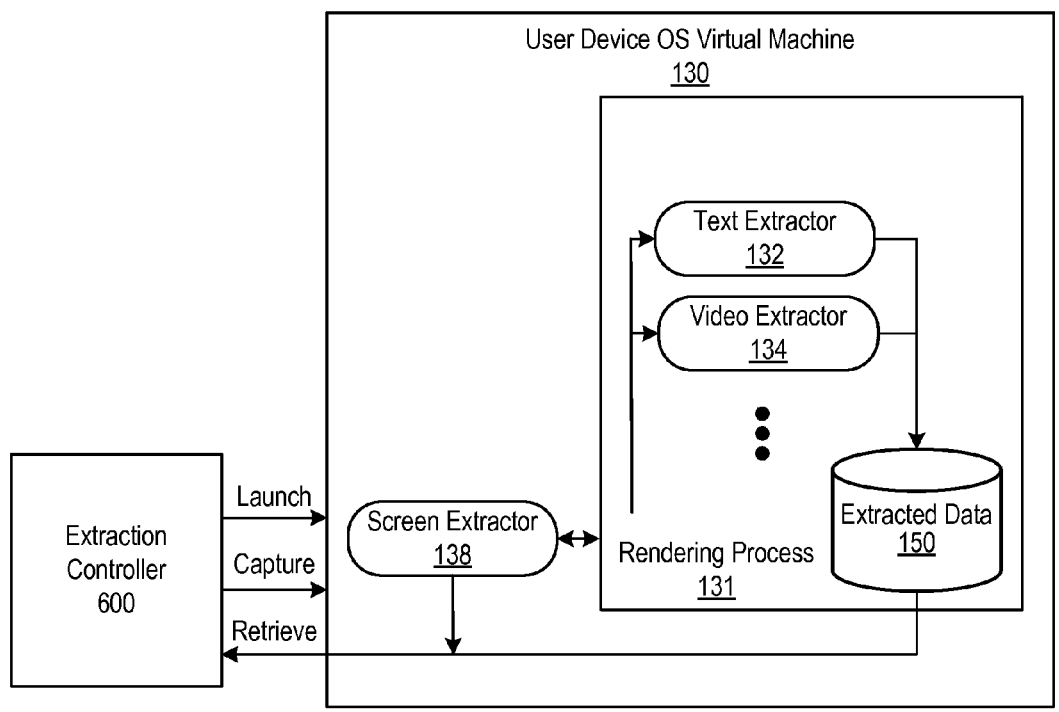
FIG. 6 is a system flow diagram of an extraction process.

In some implementations, the virtual machine 130 includes extractors that textual data for indexing, as shown in FIG. 6. The extracted textual data is, for example, data that has been embedded by the publisher for particular environment instances and is provided to a rendering process of the native application. The rendering process renders content based on the data for display on a user device. Use of extractors allows for more accurate identification of the textual data of an application instance, or alternative can be used to verify textual data that is provided separately with the uniform resource identifiers. For example, the text extractor 132 extracts text data provided to a rendering process of the native application. The text data specifies the text that is to be rendered in the environment instance in invisible form.

Other extractors can likewise be used, such as a video extractor 134. The video extractor 134 provides image data of an image or video (e.g., from a three dimensional experience) that is to be rendered in the environment of the native application 107. Other data can also be extracted, such as environment link data describing links within the application page that link to another environment in the application; web page link data describing links within the environment that link to a web resource referenced by a uniform resource locator and that, when selected, instantiate a browser application that renders the resource in a browser environment separate from the native application; etc.

To generate videos that may be used in search results, the virtual machine 130 can perform either a set of predefined actions or, alternatively, perform actions according to a predefined set of commands. In the case of the former, the virtual machine 130 may be programmed to perform certain actions such as inputting directional navigations, such as left, right, up and down; actuating direction navigation inputs, such as rotate left and rotate right, etc. In the case of the latter, the virtual machine 130 may perform actions stored in the index data 111, such as actions specified by a publisher. The actions may be specified in the form of a script, which causes a sequence of time-based inputs to be received by the program so as to generate a natural "tour" of a multi-dimensional environment; or, in the case of applications that implement artificial intelligence (e.g., "Bots"), a "bot mode" can be initiated and a video of the multi-dimensional environment as seen from the point of view of the bot can be recorded. Other appropriate ways of gathering video data to be recorded can also be used.

The extractors 132 and 134, and other appropriate data extractors, can be implemented using appropriate data handlers for a particular operating system. For example, for the Android™ operating system, the extractors 132 and 134 may be implemented using TextView objects and ImageView objects. The environment instance that corresponds to the uniform resource identifier is generated using a first OpenGL surface view of the environment instance. The textual data that is associated with the environment instance is provided to a rendering process of the native application in the form of a text view object and is overlaid on the OpenGL surface view. Because the text is designated as being invisible, the user does not see the text. The text data is also extracted from the text view object. The virtual machine 130 processes the objects to extract the corresponding data, e.g., by including instructions that cause the virtual machine to store for indexing the corresponding data that is provided for rendering.

The process 300 indexes the native application environment instance data for the native application in an index that is searchable by a search engine (310). For example, an indexer 160 indexes, for each URI and native application 107 identifier, the native application environment instance data describing the content for the application page. Additional information, such as images, screenshot and even short videos of the native application environment instance can also be generated and indexed as well. These additional data are used in native application search results, as described with reference to FIG. 3 below.

The indexed data are stored in the application index 114. A variety of appropriate indexing processes can be used to index the data. For example, the application index 114 can include, for each native application 107 and URI pair, a row of data describing the environment instance data. The particular database and indexing scheme used may, for example, depend on the search engine algorithms utilized within the search engine.

In some situations, a particular application instance may have different URIs that correspond to different content. For example, an automobile simulation application may have a first portion of a URI that is the same for an environment instances in which automobiles are rendered, and a second portion of the URI, such as a query parameter, that includes a name-value pair for a specific automobile to be rendered. In some implementations, each specific instance of a unique URI constitutes an entry in the application index 114.

Some native applications may request data and/or instructions from a source that is external to the virtual machine 130. Examples of such sources are web servers, feed sources, updated images for rendering, etc. The requested data and/or instructions may also be indexed in the application index 114. Accordingly, in some implementations, the virtual machine 130 may include a receiving cache 132 that stores data and instructions that are requested by the native application 107. The virtual machine 130 is configured to intercept the received data and store a copy of the data in the receiving cache 132 for indexing.

Figure 3:
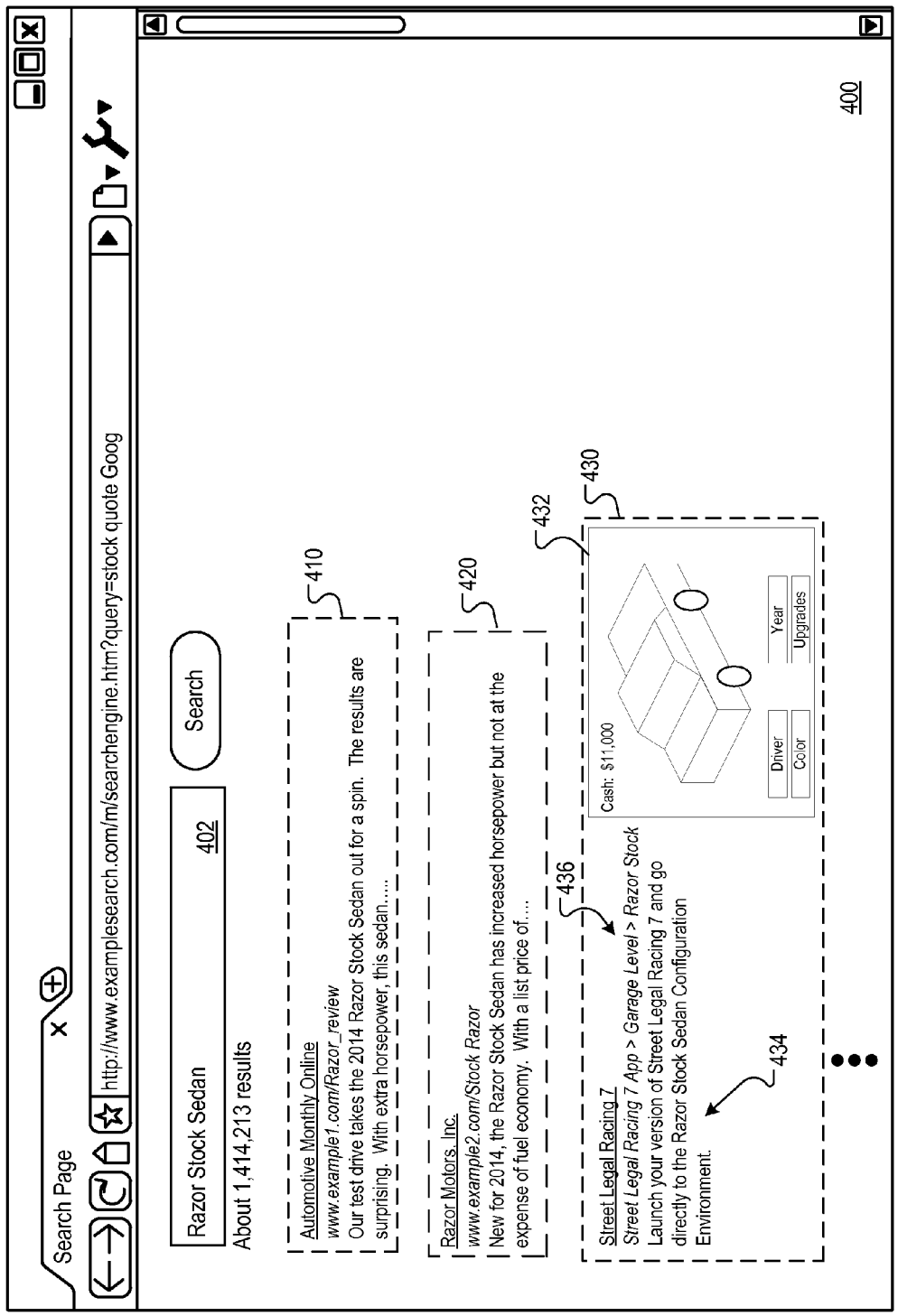
FIG. 3 is an illustration of a search results page that includes a native application search result.

After the application index 114 is built, the search engine 110 can access the application index 114 to identify native applications that may be responsive to a query. In some implementations, the applications may be identified by native application search results. For example, FIG. 3 is an illustration of a search results page 400 that includes a native application search result. Displayed in the search results page 300 are search results 410, 420 and 430 that are responsive to the query "Razor Stock Sedan" displayed in the search input field 402. The search results 410 and 420 are web search results generated in response to a search of a web index 112 of resources. Each search result 410 and 420 references a resource that can be rendered in a browser application on a user device and includes a link to the resource, and other data, such as a snippet of text extracted for the referenced resource.

The search result 430 is a native application search result that is generated in response to a search of the application index 114. The search result 430 may include, for example, an image 432 of an environment instance, a snippet 434 of text and a uniform resource identifier 436. The image 432 may be, for example, an image of a frame in an environment instance. In the example shown, the image 432 is of a fictional automobile—the Razor Stock Sedan—in a "Garage Level" environment of a game entitle "Street Legal Racing 7." The garage level, for example, is a three-dimensional environment in which the automobile rotates as if on display and within which a user may customize features of the automobile.

In some implementations, multiple images for a particular environment instance may be stored, and the image that is most relevant to the query may be selected. For example, as show in FIG. 3 the image 432 includes a particular automobile that is rendered in the game. However, assume the indexer 120 indexed data for each automobile rendered in the game, and the automobiles include the "Acme Roadster." Should the user input the query "Acme Roadster," the search result 430 would include an image for the Acme Roadster, and the uniform resource identifier 436 would include the parameter "Acme Roadster" instead of the parameter "Razor Stock."

The snippet 434 may include, for example, the name of the native application (Street Legal Racing 7) and text that has been extracted from textual data for the environment instance. For example, as shown in FIG. 3, the snippet describes the environment instance shown in the image 432. In some implementations, the snippet may be generated by the search engine 110, or, alternatively, can be predefined in the textual data along with additional data. For example, a provider of the native application may provide the following textual data for the environment search instance depicted in the image 432:

Keywords: Street Legal Racing 7; Acme Games; Garage Level; Razor; Razor Stock; Razor Stock Sedan; Razor Stock image;

Snippet: Launch your version of Street Legal Racing 7 and go directly to the Razor Stock Sedan Configuration Environment.

In the example above, the keywords listed are designated keywords for the "Garage Level" environment instance of the game. The Snippet is a snippet that the publisher of the game has defined to be shown in an appropriate native application search result.

The uniform resource identifier 436 is an actionable identifier that, when selected, causes the subject application to launch on the user device. In some implementations, the command line arguments "Garage Level" and "Razor Stock" cause the application to automatically navigate from an initial start-up screen to a display of the Razor stock sedan in the Garage level of the game. In other implementations, the command line arguments cause the application to instantiate at the display of the Razor stock sedan in the Garage level of the game. The uniform resource identifier 436 can be specified by the publisher or alternatively, determined by the indexer during a crawl of the native application.

In some implementations, selection of the search result 430 at the user device causes the native application to launch and generate an instance of the environment depicted in the image 432. For example, provided the native application Street Legal Racing 7 is installed on the user device, selecting search result 430 causes the native application to launch and generate the environment instance that corresponds to the image 432. This can be accomplished, for example, by passing the input values of "Garage Level" and "Razor Stock" for the native application. Such command line parameters can be defined by the publisher of the native application. If, on the other hand, the native application is not installed, then selection of the image 430 may cause the user device 108 to display a web page resource at which the particular native application may be downloaded (optionally subject to purchase) and installed on the user device 108.

Figure 4:
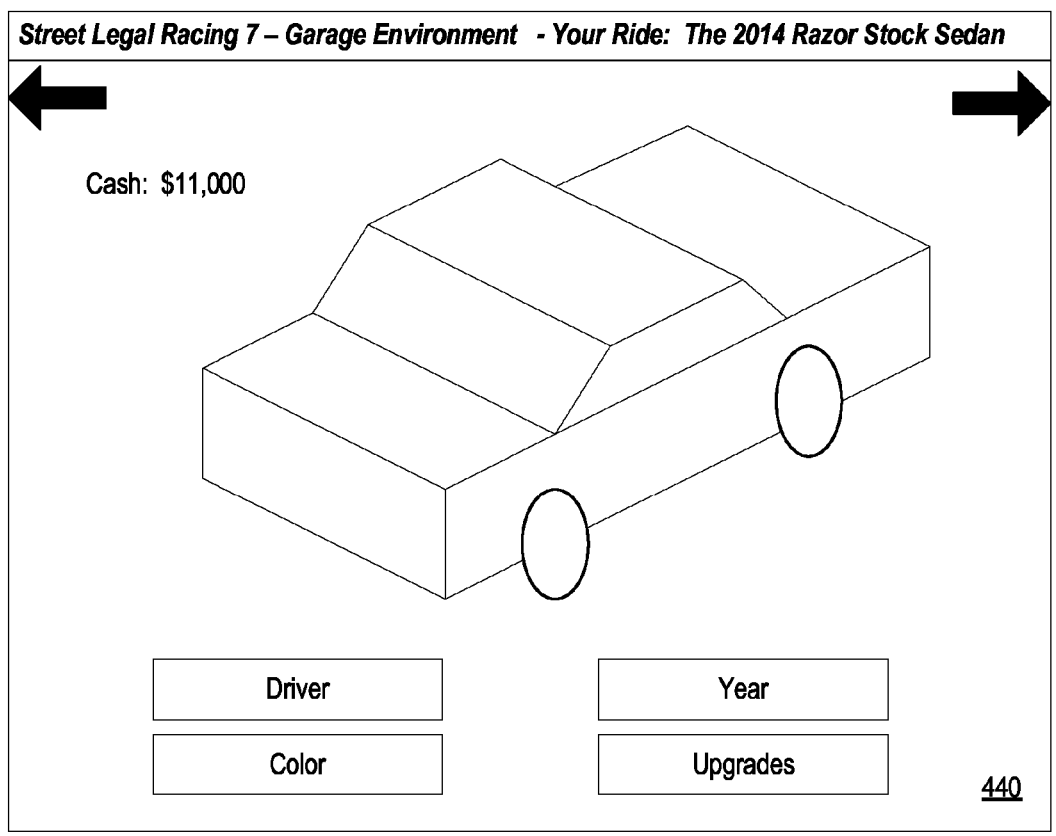
FIG. 4 is an illustration of an instantiation of an environment instance of a native application in response to a selection of the native application search result.

FIG. 4 is an illustration of an instantiation of an environment instance 440 of a native application in response to a selection of the native application search result 430. As shown in FIG. 4, the "Garage Level" of Street Legal Racing 7 is shown. The environment may be an image or, alternatively, may be a three dimensional environment in which the user may manipulate the rendered automobile such as by rotating, changing parts, etc.

In some implementations, the native application search result 430 may include a short video instead of an image. For example, if the environment instance is an activity simulation, such as skiing, then the native application search result 430 may include a short movie depicting an in-game experience of skiing. The movie can be generated, for example, by the virtual machine 130 using screen capture techniques. In some implementations, the publisher of the native application may specify whether a movie is to be generated by an appropriate parameter in the index data.

In the case of an environment being a three dimensional environment and in which the textual data is provided as invisible text, in some implementations the invisible text is rendered for a predefined time period that is long enough for the virtual machine to capture the text. For example, for the first N frames or the first M seconds, the invisible text is rendered.

Figure 5:
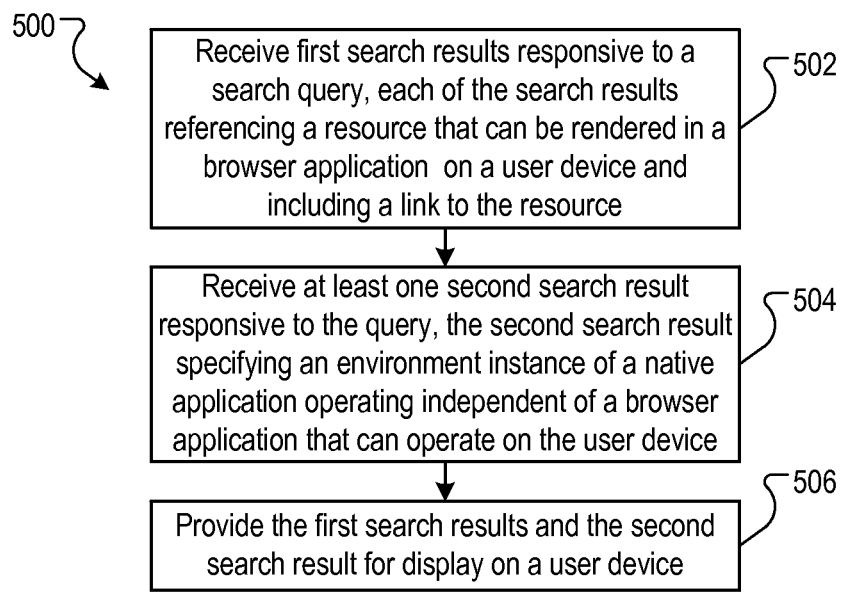
FIG. 5 is a flow diagram of an example process of providing search result for web page resources and native applications.

FIG. 5 is a flow diagram of an example process 500 of providing search results for web page resources and native applications. The process 500 can be implemented in a data processing apparatus of one or more computers in data communication.

The process 500 receives first search results responsive to a search query, each of the search results referencing a resource that can be rendered in a browser application on a user device and including a link to the resource (502). For example, as described above, a web server for a search engine may receive web search results 410 and 420, each of which are responsive to a query.

The process 500 receives at least one second search result responsive to the query, the second search result specifying an environment instance of a native application operating independent of a browser application that can operate on the user device (504). Again, as described above, a web server for a search engine may receive native application search result 430 responsive to the query.

The process 500 provides the first search results and the second search result for display on a user device (506). For example, the web server for the search engine may order the search results according to a ranking and provide the search result so that the search results are displayed according to the rank.

FIG. 6 is a system flow diagram of an extraction process. An extraction controller 600 communicates instructions to the virtual machine 130 and receives application page data and screen data from the virtual machine 130. In operation, the extraction controller 600 instructs the virtual machine 130 to launch a particular native application 107, to access particular application pages within the native application 107 and to capture the application page data for each application page.

A rendering process 131 of the virtual machine 130 receives the application page data to render the content of the application page. The virtual machine 130 includes extractors, e.g., extractors 132 and 134, etc., and that operate as described above. In some implementations, the extractors are implemented as instructions that store the frame data provided to the rendering process 131 as extracted data 150.

For example, the extractors may include instructions that access particular objects of a view class, where each object occupies an area on a display of the application page when rendering is complete. The application page data are data for the particular objects of each view class. For example, for the Android™ operating system, the extractors 132 and 134 may be implemented to access the TextView objects and ImageView objects, respectively.

The extracted data 150 are retrieved by the extraction controller 600 and provided, for example, to the indexer 160.

Figure 7:
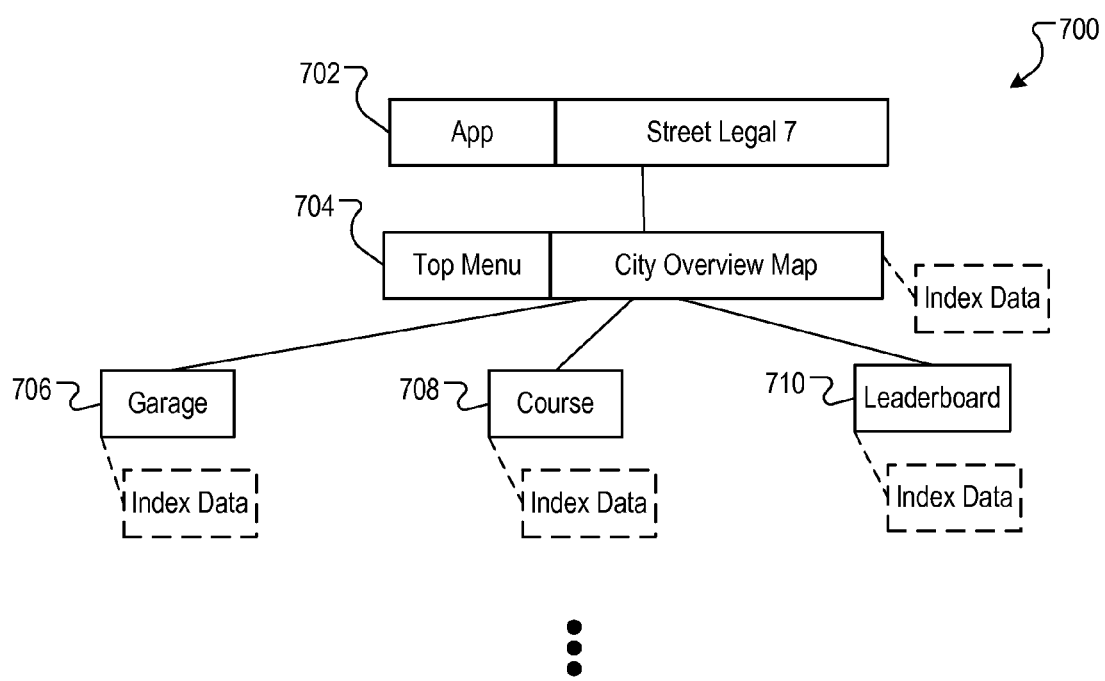
FIG. 7 is a depiction of a portion of a native application map with corresponding index data.

FIG. 7 is a depiction of a portion of a native application map 700 with corresponding index data. Each node below the root node 702 in the map corresponds to an environment instances. For example, node 704 corresponds to the top menu of the native application; node 706 corresponds to garage environment; node 708 corresponds to the course environment; and node 710 corresponds to leaderboard environment. With each node is associated index data (e.g., textual data) describing the environment instance. The native application map 700 can be used by the indexer to index application instance of a native application without requiring instantiation and exploration of the native application. In some implementations, however, a virtual machine 130 can be used to verify the description of the textual data when the textual data is included in the application to be rendered as invisible text in the environment instance. Alternatively, the index data can be verified by human reviewers.

Although the examples above are described primarily in the context of a game native application, the subject matter can be applied to a native application of any type of subject matter. For example, native applications that illustrate and generate videos of chemical compounds, or that provide three-dimensional tours of landscapes and travel destinations, can also be processed, indexed and searched as described above.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The environment computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus comprising one or more computers in data communication, the method comprising:
    determining, for a native application that generates an application environment for display on a user device within the native application, the native application operating independent of a browser application that can operate on the user device, a set of environment instances of the native application, the determining comprising receiving a set of uniform resource identifiers for the native application from a publisher of the native application, each uniform resource identifier in the set of uniform resource identifiers corresponding to a corresponding environment instance in the set of environment instances;
    for each environment instance:
    determining textual data describing features of the corresponding environment instance, the textual data being data that is not rendered to be visible when the native application renders the environment instance on a user device display, the determining of textual data comprising:
    instantiating a virtual machine emulating an operating system of a user device;
    instantiating, within the virtual machine, the native application;
    accessing, within the virtual machine, the uniform resource identifier to which the environment instance corresponds, and in response to accessing each uniform resource identifier:
    generating in the virtual machine the environment instance that corresponds to the uniform resource identifier; and
    extracting the textual data provided to a rendering process of the native application, wherein the textual data is identified as invisible textual data for the rendering process so that the textual data is not rendered to be visible when the native application renders the environment instance on a user device display;
    generating, from the textual data, native application environment instance data describing content of the environment instance; and
    indexing the native application environment instance data for the native application in an index that is searchable by a search engine.

2. The computer-implemented method of claim 1, wherein:
    determining a set of uniform resource identifiers for a native application comprises receiving the uniform resource identifiers from a publisher of the native application; and
    determining textual data describing features of the corresponding environment instance comprises receiving from the publisher and for each of the uniform resource identifiers textual data that is identified by the publisher as describing features of the environment instance corresponding to the uniform resource identifier.

3. The computer-implemented method of claim 1, wherein:
    generating in the virtual machine the environment instance that corresponds to the uniform resource identifier comprises generating a first OpenGL surface view of the environment instance;
    extracting the textual data provided to a rendering process of the native application comprises:
        generating a text view object that includes the text data and that is overlaid on the OpenGL surface view; and
        extracting the text data from the text view object.

4. The computer-implemented method of claim 1, further comprising: receiving, from a search engine, a query and data identifying one of the application environment instances as being responsive to the query based, in part, on the native application environment instance data; and
    generating a search result that identifies the corresponding environment instance of the native application as being responsive to the query.

5. The computer-implemented method of claim 4, wherein generating the search result comprises:
    including in the search result:
        the uniform resource identifier corresponding to the environment instance of the native application; and
        image data depicting an image of the environment instance;
    wherein the selection of the search result by the user device causes the user device to instantiate the native application installed on the user device and navigate to the environment instance depicted in the search result.

6. The computer-implemented method of claim 4, wherein generating the search result comprises:
    including in the search result:
        the uniform resource identifier corresponding to the environment instance of the native application; and
        image data depicting an image of the environment instance;
    wherein the selection of the search result by the user device causes the user device to present an installation option on the user device to install the native application on the user device when the native application is not installed on the user device.

7. The computer-implemented method of claim 1, further comprising, for each environment instance:
    determining rendered textual data of environment instance, the rendered textual data being data that is rendered to be visible when the native application renders the environment instance on a user device display; and
    generating native application environment instance data further comprises describing content of the environment instance generating from the rendered textual, the native application environment instance data.

8. A system, comprising:
a data processing apparatus; and
a non-transitory computer readable storage medium storing instructions executable by the data processing apparatus and that upon execution cause the data processing apparatus to perform operations comprising:
determining, for a native application that generates an application environment for display on a user device within the native application, the native application operating independent of a browser application that can operate on the user device, a set of environment instances of the native application, the determining comprising receiving a set of uniform resource identifiers for the native application from a publisher of the native application, each uniform resource identifier in the set of uniform resource identifiers corresponding to a corresponding environment instance in the set of environment instances;
for each environment instance:
determining textual data describing features of the corresponding environment instance, the textual data being data that is not rendered to be visible when the native application renders the environment instance on a user device display, the determining of textual data comprising:
instantiating a virtual machine emulating an operating system of a user device;
instantiating, within the virtual machine, the native application;
accessing, within the virtual machine, the uniform resource identifier to which the environment instance corresponds, and in response to accessing each uniform resource identifier:
generating in the virtual machine the environment instance that corresponds to the uniform resource identifier; and
extracting the textual data provided to a rendering process of the native application, wherein the textual data is identified as invisible textual data for the rendering process so that the textual data is not rendered to be visible when the native application renders the environment instance on a user device display;
generating, from the textual data, native application environment instance data describing content of the environment instance; and
indexing the native application environment instance data for the native application in an index that is searchable by a search engine.

9. The system of claim 8 wherein:
determining a set of uniform resource identifiers for a native application comprises receiving the uniform resource identifiers from a publisher of the native application; and
determining textual data describing features of the corresponding environment instance comprises receiving from the publisher and for each of the uniform resource identifiers textual data that is identified by the publisher as describing features of the environment instance corresponding to the uniform resource identifier.

10. The system of claim 8, wherein:
generating in the virtual machine the environment instance that corresponds to the uniform resource identifier comprises generating a first OpenGL surface view of the environment instance;
extracting the textual data provided to a rendering process of the native application comprises:

generating a text view object that includes the text data and that is overlaid on the OpenGL surface view; and
extracting the text data from the text view object.

11. The system of claim 8, wherein the operations further comprise: receiving, from a search engine, a query and data identifying one of the application environment instances as being responsive to the query based, in part, on the native application environment instance data; and
generating a search result that identifies the corresponding environment instance of the native application as being responsive to the query.

12. The system of claim 11, wherein generating the search result comprises:
including in the search result:
the uniform resource identifier corresponding to the environment instance of the native application; and
image data depicting an image of the environment instance;
wherein the selection of the search result by the user device causes the user device to instantiate the native application installed on the user device and navigate to the environment instance depicted in the search result.

13. The system of claim 12, wherein generating the search result comprises:
including in the search result:
the uniform resource identifier corresponding to the environment instance of the native application; and
image data depicting an image of the environment instance;
wherein the selection of the search result by the user device causes the user device to present an installation option on the user device to install the native application on the user device when the native application is not installed on the user device.

14. A non-transitory computer readable memory storing instructions executable by a data processing apparatus and that upon execution cause the data processing apparatus to perform operations comprising:
determining, for a native application that generates an application environment for display on a user device within the native application, the native application operating independent of a browser application that can operate on the user device, a set of environment instances of the native application, the determining comprising receiving a set of uniform resource identifiers for the native application from a publisher of the native application, each uniform resource identifier in the set of uniform resource identifiers corresponding to a corresponding environment instance in the set of environment instances;
for each environment instance:
determining textual data describing features of the corresponding environment instance, the textual data being data that is not rendered to be visible when the native application renders the environment instance on a user device display, the determining of textual data comprising:
instantiating a virtual machine emulating an operating system of a user device;
instantiating, within the virtual machine, the native application;
accessing, within the virtual machine, the uniform resource identifier to which the environment instance corresponds, and in response to accessing each uniform resource identifier:
generating in the virtual machine the environment instance that corresponds to the uniform resource identifier, and extracting the textual data provided to a rendering process of the native application, wherein the textual data is identified as invisible textual data for the rendering process so that the textual data is not rendered to be visible when the native application renders the environment instance on a user device display;

generating, from the textual data, native application environment instance data describing content of the environment instance; and indexing the native application environment instance data for the native application in an index that is searchable by a search engine.

* * * * *